United States Patent Office

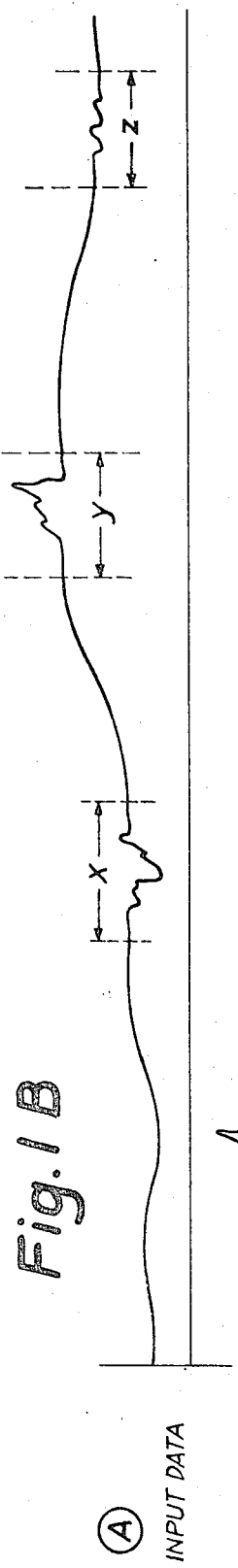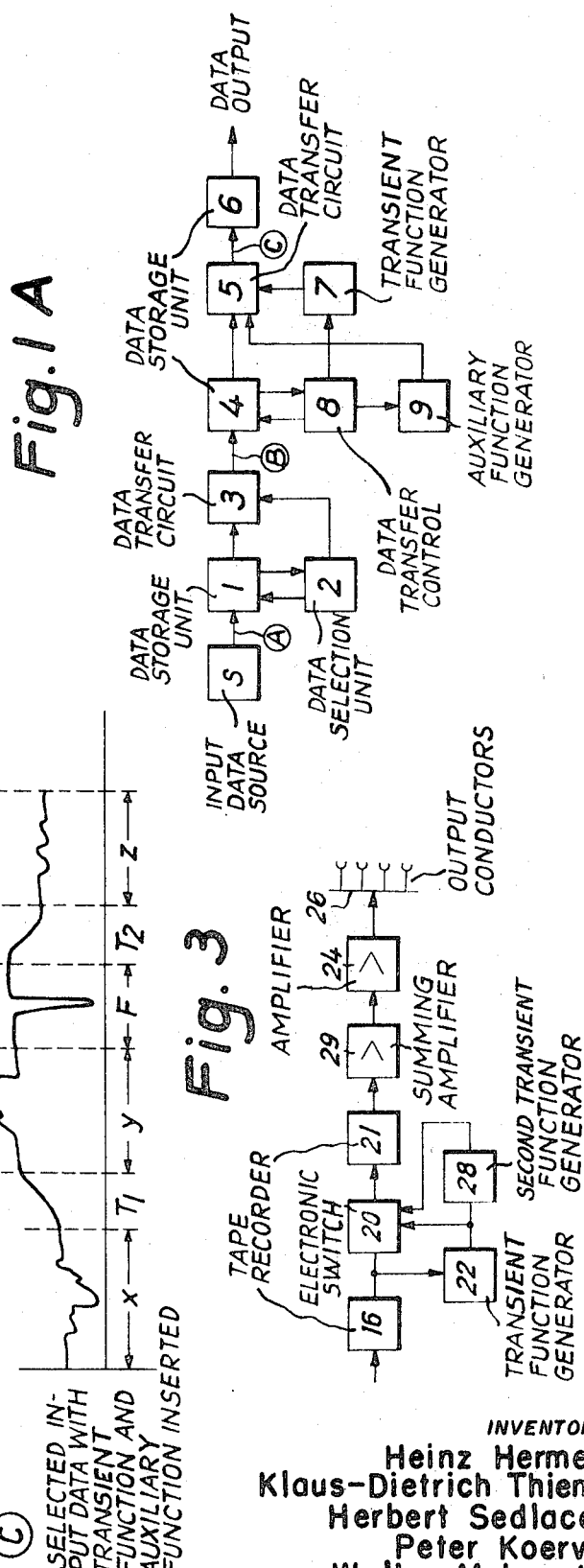

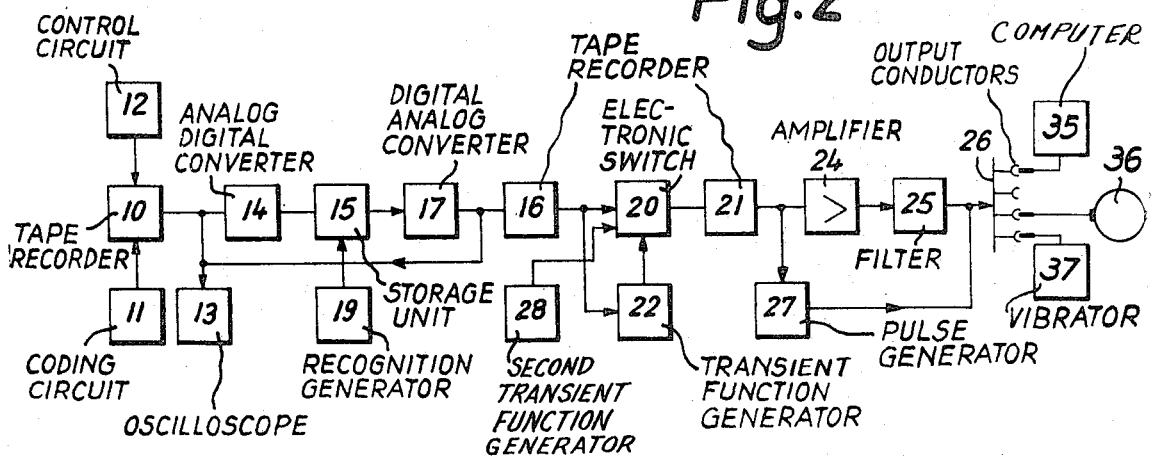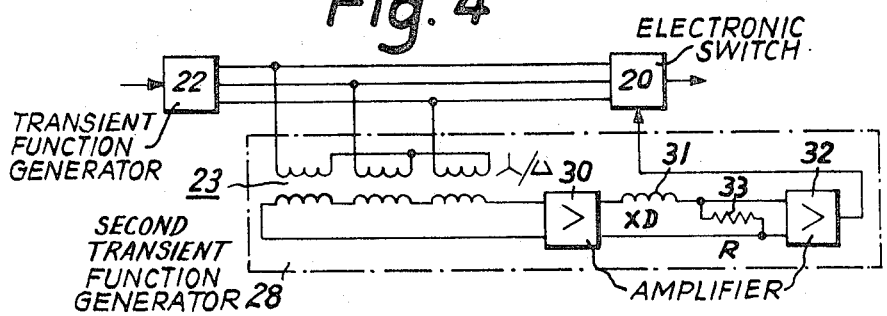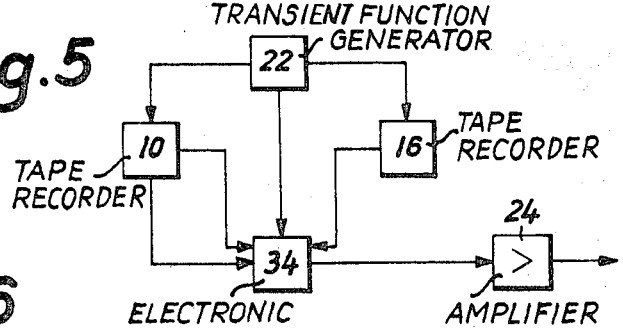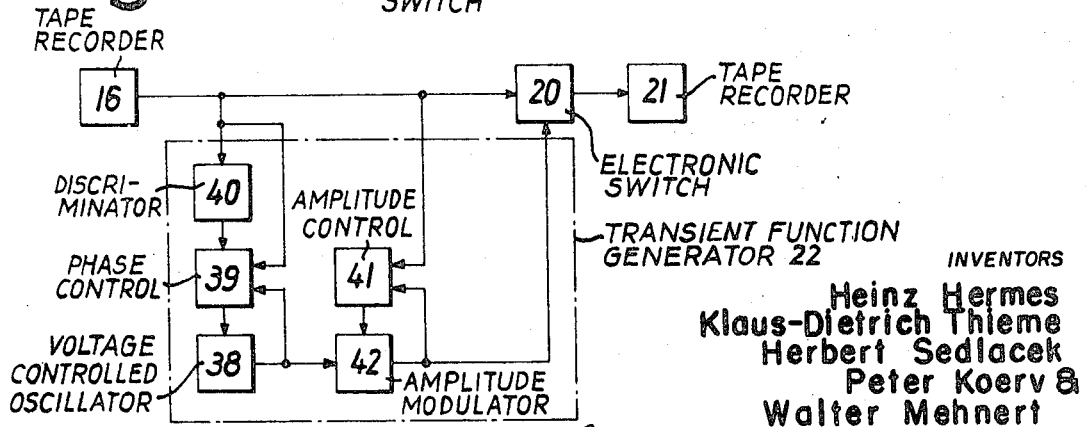

3,551,891
Patented Dec. 29, 1970

3,551,891
METHOD AND APPARATUS FOR SIMULATING VARIABLES
Heinz Hermes, Hamburg, Klaus-Dietrich Thieme, Wedel, Holstein, Herbert Sedlacek, Hamburg, Peter Koerv, Anzing, and Walter Mehnert, Munich, Germany, assignors to Licentia Patent-Verwaltungs-G.m.b.H., Frankfurt am Main, and Entwicklungsring Sud G.m.b.H., Munich, Germany
Filed Feb. 23, 1967, Ser. No. 618,205
Claims priority, application Germany, Feb. 24, 1966, L 52,935
Int. Cl. G11b 5/04, 27/00
U.S. Cl. 340—172.5          18 Claims

ABSTRACT OF THE DISCLOSURE

Varying electrical signals which accurately represent physical and/or electrical variables for testing the performance of electrical components are stored in a first storage unit. Portions of the stored signals which are of interest for testing electrical components are selected and transferred to a second storage unit. The selected signals are then transferred in time sequence to a third storage unit and transient functions are simultaneously inserted between the end of one selected signal portion and the beginning of the next selected signal portion to produce a continuous signal for testing the electrical components. Auxiliary functions which are not included in the stored signals can also be inserted between the selected signal portions when they are transferred from the second to the third storage unit.

BACKGROUND OF THE INVENTION

This invention relates to a method and apparatus for storing and reproducing electrical signals which represent physical and/or electrical variables for testing the performance of electrical components and devices. Such a method of testing is always desirable where it is difficult or too costly to test the electrical components and devices under actual operating conditions, as is true, for example, in testing the electric circuitry for an airplane.

A number of circuits are known in the art for simulating physical and/or electrical variables, as disclosed, for example in German Pat. Nos. 881,837, 956,317, 751,692 and 737,433.

In particular, a circuit for testing the performance of aircraft electrical and electronic components is known in which the inputs to a motor-generator are simulated by a variable program transmitter which produces variable voltages for the motor speed control and for the generator voltage control circuit. This device, however, has the disadvantage that it is not possible to recreate the exact variations of voltages and frequencies which are encountered under operating conditions during the various flight maneuvers, particularly with respect to the small time constants of the variations in voltage and frequency.

Accordingly, the object of this invention is to provide a method of storing, reproducing, and/or generating varying signals which accurately represent the physical and/or electrical variables that occur in actual operating conditions of the device to be tested.

SUMMARY OF THE INVENTION

In accordance with this invention, the above noted problems are solved by storing signals which accurately represent physical and/or electrical variables for testing the performance of electrical components in a first storage unit. Portions of the stored signals which are of interest for testing electrical components are selected and transferred to a second storage unit. The selected signals are then transferred in time sequence to a third storage unit and transient functions are simultaneously inserted between the end of one selected signal portion and the beginning of the next selected signal portion to produce a continuous signal for testing the electrical components.

The significances of the method according to this invention lies in the compilation of storage unit signals which accurately represent the actual characteristic values and the variations of these values for the system to be simulated. The signals thus stored are subsequently utilized to drive power amplifiers or electrically driven devices to which the object to be tested is connected. It is further significant that the simulation signals can be reproduced at will for testing various devices. Once the appropriate variable signals have been stored for a given system, they can be used for continuous testing as often as desired.

In the reproduction of signals representing a physical or electrical system, the variations of these values are of primary interest for a testing operation. If, for example, the voltages and frequencies of the electrical circuitry of an airplane are to be reproduced, the variations in voltage and frequency occurring during the various flight maneuvers are of interest for a testing operation whereas the static state of voltage and frequency is not.

The application of varying electrical signals representing the variables of the physical system generally occurs during normal operating conditions of the physical system. Thus, for example, the behavior of the circuitry on board an airplane is recorded during operation over a certain number of flying hours. At the same time, or later, the stored signals are provided with a code word so that each stored signal can be relocated. Since, however, only part of the stored signals are of interest for testing purposes, an operator selects certain stored signals with the aid of a selector device through consecutive visual reproduction of all of the signals stored in the first storage unit, and transfers to the second storage unit only those stored signals which correspond to the interesting signals. These selected portions of the stored signals are, however, not suited for testing purposes, since discontinuities will be present between the selected signals portions, and the signals will therefore not correspond to the actual conditions to be simulated. The signals stored in the second storage unit are therefore transferred to a third storage unit and a function generator simultaneously creates a transient function by which the selected signal portions are smoothly connected, the transient function preferably being approximately adjusted to the actual conditions. Only after the selected signals have been thus prepared can they be used for testing purposes. The storage of signals in the first storage unit does not necessarily have to occur under normal operating conditions of the physical system, however. The signals can also be stored according to a predetermined operating program if desired.

To apply the method according to the invention, an apparatus is provided containing the following units;

(1) a first storage unit for storing the varying electrical signals which represent physical and/or electrical variables;

(2) a selector device for selecting the stored signals which are of interest and a second storage unit for accepting the selected signals; and (3) a third storage unit and a function generator for smoothly connecting the signals selected from the second storage unit with the aid of transient functions when they are transferred to the third storage unit and also for inserting auxiliary functions between the selected signals if desired.

BRIEF DESCRIPTION OF THE DRAWINGS

FIG. 1a is a general block diagram of one embodiment of the invention.

FIG. 1b is a set of waveforms illustrating the operation of the embodiment shown in FIG. 1.

FIG. 2 is a detailed block diagram of another embodiment of the invention.

FIG. 3 is a block diagram of an alternate circuit of a portion of the embodiment shown in FIG. 2.

FIG. 4 is a block diagram of one of the function generators shown in FIG. 3.

FIG. 5 is a block diagram of an alternate circuit for another portion of the embodiment shown in FIG. 2.

FIG. 6 is a detailed block diagram of the transient function generator 22 shown in FIGS. 2 through 5.

DESCRIPTION OF THE PREFERRED EMBODIMENTS

Referring to FIGS. 1a and 1b, varying electrical signals A, which represent physical and/or electrical variables for testing electrical components, are generated in an input data source S and are applied to a first storage unit 1. Portions X, Y, and Z of the stored signals, which are of interest for testing electrical components, are selected by a data selection unit 2 and transferred via a data transfer circuit 3 to a second data storage unit 4. The selected signals are transferred in time sequence from data storage unit 4 via another data transfer circuit 5 to a third data storage unit 6. At the same time, transient functions are inserted between the end of one selected signal and the beginning of the next selected signal by a transient function generator 7 whose operation is controlled in synchronism with the transfer of data by a data transfer control 8. Auxiliary functions which are not included in the stored signals can be introduced by means of an auxiliary function generator 9, whose operation is also controlled by data transfer control 8. Waveform C in FIG. 1b shows the combined output of data transfer circuit 5 with two transient functions $T_1$ and $T_2$ and an auxiliary function F inserted between the selected signal portions X, Y, and Z. These combined signals are stored in data storage unit 6 for application to electrical components whose performance is to be tested. As can be seen in waveform C, the combined signals are smoothly joined by the transient function to form a continuous signal. In this particular example, the signals are varying voltages, but it should be understood that the invention is also applicable to signals which vary in frequency or in phase rather than in voltage.

In a preferred embodiment of the invention, the storage units comprise multi-track tape recorders with associated oscillators having $n$ different carrier frequencies. Recording on the tape recorders is accomplished by means of carrier frequency modulation so that, e.g., frequencies from zero to very high values can be registered. In this method of recording, $n$ recording channels are available on each track of the magnetic tape, since each channel is associated with one of $n$ different carrier frequencies. With high quality tape recorders having, for example, 14 tracks, $n$ times 14 independent recording channels are thus available.

The first storage unit can also be utilized as the third storage unit upon completion of transfer to the second storage unit, if desired, so that only two physical storage units are required to apply the method of this invention.

Not all stored signals from the first tape recorder are transferred to the second tape recorder. Only the stored signals which are of interest are transferred to the tape of the second tape recorder. To fully utilize the capacity of the second tape recorder, and to store as much information as possible on the tape, it is desirable to place the stored signals on the second tape as free of interruptions as possible. It is further desirable to carefully reanalyze the signals stored in the second tape recorder. In a further embodiment of the invention, an intermediate storage unit with short access time is connected between the two tape recorders in such a manner that the signals stored in the first tape recorder are first transferred to the intermediate storage unit, and the second tape recorder then reads out the signals stored in the intermediate storage unit so that the stored signals are transferred as smoothly as possible from the intermediate storage unit to the second tape recorder.

A further embodiment of the invention utilizes a magnetic disc storage unit for the intermediate storage unit with an analog-to-digital converter coupled to the input thereof, a digital-to-analog converter coupled to the output thereof, and a recognition generator for applying further coded identifying marks to the signals in the intermediate storage unit. With the aid of the time base expansion, an exact analysis of the signals stored in the intermediate storage unit is possible, for example, by visually reproducing the signals in time sequence on the display of a cathode ray oscilloscope. The individual stored signals can further be provided with additional identifying marks by means of the above-mentioned coding device.

In order to be able to relocate each individual stored signal, identifying marks are associated with each signal stored in the first storage unit. This is accomplished by means of a coding device which, according to the invention, consists of (1) a time code generator whose output signals represent in coded form the time expired from a specified moment and serve to consecutively identify the stored signals;

(2) a time code search device which selects a predetermined code from the identifications provided by the time code generator and responds to the presence of the selected codes; and (3) a control device which upon selection of the predetermined identification marks by the time code search device, actuates a continuous discharge of the signals stored from this point on for a predetermined period of time.

The selector device with which the signals stored in the first storage unit are selected and transferred to the second storage unit may comprise a cathode ray oscilloscope which serves to visually reproduce the stored signals of the first storage unit. In this case, an operator observes the stored signals on the oscilloscope screen and only releases the interesting stored signals by means of the coding device for transfer to the second storage unit. In other embodiments of the invention, however, the selection and transfer of the interesting signals may be performed automatically.

Since the object to be tested is subjected to as many of the operating conditions encountered by the physical system as possible, a further proposal of the invention consists in providing a fourth storage unit in addition to the intermediate storage unit to alter the sequence of the signals stored in the second storage unit, and an additional selector device for transferring the stored signals through the intermediate storage unit to the fourth storage unit. The output of the fourth storage unit, in conjunction with the transient function generator, then provides the input of the third storage unit as in the above-described method. The intermediate storage unit utilized for this step of the method can be the same as the intermediate storage unit connected between the first and the second storage units.

Thus, the finally compiled contents of the third storage unit, which are for example in the form of a tape containing a recording of stored signals, consists of excerpts of the signals stored in the first storage unit not only in their original sequence but also arranged in a sequence according to a predetermined program or mixed in any statistically desired sequence by means of, for example, a random generator. In changing the sequence of the signals stored in the second storage unit, the same multitrack tape recorder can also be used as the first and fourth storage units.

One embodiment of the transient function generator contains oscillators as transient function generators which can be modulated in frequency, amplitude, and phase, and which transfer the stored signals smoothly and without interruption by means of a transient function whereby the beginning of the transient function has the same characteristics as the end of the first stored signal and the end of the transient function has the same characteristics as the beginning of the next stored signal. Shortly before a stored signal reaches its end during transfer from the second to the third storage unit, an oscillator is carried along in frequency, phase and voltage, which upon the end of the stored signal takes over the function of the stored signal and transfers it to the third storage unit. The sensing device of the oscillator assures that the oscillator reproduces the recorded stored signal as accurately as possible. With the beginning of the next stored signal, the sensing device of the oscillator now follows this signal and corrects the output function of the oscillator accordingly. Following this correction, the succeeding stored signal is transmitted directly to the third storage unit. In this way, there is always a smooth and uninterrupted transition between two stored signals. An electronic switch is connected between the second and the third storage unit so that the second storage unit or the oscillator serving as transient function generator are alternately connected to the third storage unit.

The signals stored in the third storage unit serve, for example, to control power amplifiers which, according to the invention, are preferably amplifiers with an internal resistance approaching zero.

It is not always practical to reproduce the signals representing the physical or electrical system by means of power amplifiers. Peak circuit voltages, for example, in the circuitry of an airplane cannot be conveniently transmitted through conventional power amplifiers. In this case, a recognition generator is associated with the intermediate storage unit between the first and second tape recorder. This recognition generator provides signals stored in the intermediate storage unit with additional markings in the form of auxiliary pulses which correspond to the position of additional pulses not recorded by the first tape recorder, and follow the course of the stored signals transferred to the second tape recorder. There, however, they serve to control a special power pulse generator whose output voltage is superimposed on the output voltage of the power amplifier.

Another proposal of the invention provides that electronic computers are provided as the electrical device to which the stored signals of the third storage unit are applied. This is done, on the one hand, to analyze the final storage unit signals, which, according to the invention, recreate a plurality of parameters and variations in parameters of a physical system, and, on the other hand to predetermine a definite desired function for example, a function program. Thus the computer can be preset to execute functions or function programs in a simple manner which otherwise would be difficult to execute.

Another proposal provides that an electrodynamic vibrating table is provided as an electrically controllable device which serves to test objects for mechanical strength. To test electrical components for use in aircraft, it is advantageous to be able to simulate, with the aid of a vibrating table, the actual mechanical vibrations to which these components are exposed during flight, and to simultaneously introduce other physical values which reproduce the actual environmental conditions.

Since the generator of an airplane is driven by the plane's turbine, it might be advantageous to stimulate the speed variations of the turbine which frequently occur during flight and affect the generator for the electric circuitry on board. It is hereby proposed, according to the invention, to provide an electrical machine as the electrically controllable device whereby the stored signals serve to control the speed of the machine.

In case the storage unit contents compiled for testing purposes are not only to consist of stored signals derived from measurements in the system to be simulated, the invention further proposes to associate with the transient function generator an auxiliary function generator which can be switched on at will and which serves to create desired functions for frequencies, voltages and phases which are transferred via the intermediate storage unit to the second tape recorder or to the third tape recorder in place of stored signals.

In this manner, for example, functions derived from analog computers or function generators can be inserted between the stored signals. It is thereby possible, of course, to change the spacing between two stored signals during their transfer from the second to the third storage unit at will, whereby these new functions can then be inserted into the spaces thus created.

In case fluctuations are to be simulated in a multiphase system, whereby the system generally carries an unbalanced load, a difficulty arises because of the flow of current in the neutral (star) point of the generator feeding the system. This causes a corresponding displacement in the voltage system of the receivers connected to the system. During recording with the first storage unit it is, however, advisable to measure only the phase voltages at the input point of the system. One can, however, additionally measure a voltage proportional to the neutral point current. This voltage is then applied to the storage unit. If the power amplifier is then controlled by a combination of the voltages corresponding to the phase voltages and the voltages corresponding to the neutral point currents, the receiver disposed at the output of the power amplifier will receive a voltage almost like the one it would encounter in the system to be simulated.

The invention, therefore, proposes a method to stimulate frequencies, voltages and their phase position within a multiphase system, wherein (1) a first tape recorder stores currents proportional to the phase voltages of the system at its input points;

(2) the first tape recorder simultaneously stores currents proportional to the neutral point currents;

(3) a coding device simultaneously or later associates identifying characteristics with the stored signals which will make it possible to relocate each individual stored value;

(4) the stored signals corresponding to the interesting variations in voltages of the first storage unit are subsequently released, by means of a selector device, for transfer to a second storage unit, which consecutively receives only the selected stored signals;

(5) the stored signals of the second storage unit corresponding to the phase voltages are transferred to a third storage unit, and a first transient function generator, essentially consisting of oscillators which can be modulated in frequency, amplitude and phase, transfers the individual stored signals smoothly and without interruptions by means of a first transient function, the start of the transient function being analog to the characteristics of the end of the first stored signal, and the end of the transient function being analog to the characteristics of the beginning of the succeeding stored signal;

(6) the stored signals of the second storage unit corresponding to the neutral point currents are simultaneously transferred to a third storage unit, and a second transient function generator inserts a second transient function which corresponds to the neutral point curents for the voltages represented by the first transient function;

(7) the stored signals of the storage unit corresponding to the phase voltages and the stored signals corresponding to the neutral point currents are then superimposed before the signals reach the output power amplifier.

Since the stored signals corresponding to the phase voltages are transferred without discontinuities by means of the first transient function, further transient functions must be inserted into the gaps between the stored signals corresponding to the neutral point currents. These, however, must be formed in dependence on the transient functions analog to those of the phase voltages, because a certain neutral point current always corresponds to a certain phase voltage of the system.

For the second transient function generator, which inserts the transient function between the stored signals corresponding to the neutral point current, a circuit is provided wherein the first transient function voltages are vectorially added and the resulting total voltage is applied to an impedance simulating the synchronous reactance of the generator, whereby the current flowing through this impedance corresponds to the neutral point current which would flow in the system if phase voltages corresponding to the transient function voltages were present, and wherein the output voltage of the second transient function generator simulates this current.

By varying the impedance which is to simulate the synchronous reactance of the generator, it is possible to achieve any desired shifts in the voltage system for the receivers disposed at the output of the power amplifier.

One embodiment of the invention which simulates the parameters of an electrical system on board an airplane is explained in detail below with reference to FIGS. 2, 3, and 4.

Referring to FIG. 2, signals measured during operation of the circuitry on board an airplane, such as phase voltages, frequencies and phase positions, are stored in independent channels of a first tape recorder 10. During the storage operation, or later, identifying characteristics are associated with the signals stored in the first storage unit by a coding circuit 11 to aid in relocation of each individual stored signal. The coding circuit 11 contains the following units, which are not shown in detail in the drawings, since their construction will be apparent to those skilled in the art: a time code generator whose output signals represent, in coded form, the time expired from a definite moment and serve to continuously identify the stored signals; a time code search circuit which selects a predetermined characteristic from the characteristics generated by the time code generator and recorded on the magnetic tape; and a control circuit 12, which initiates continuous discharge of the stored signals after the predetermined characteristic has been detected by the time code search circuit. Circuit 11 could, for example, be constituted by the Astrodata Model 5400 Time Code Translator/Generator manufactured and sold by Astrodata, Inc., Anaheim, Calif., and described in its Bulletin 5400–100A copyrighted in 1965. Circuit 12 could be constituted by a Model 5600 Tape Search System manufactured by the same firm and disclosed in its Bulletin 50901 copyrighted in 1965.

The signals stored in the first tape recorder 10 are visually reproduced by means of a selector device which essentially consists of a cathode ray oscilloscope 13. Only the phase voltage time sequence which is of interest for testing or other purposes is transferred to an intermediate storage unit 15 via an analog-to-digital converter 14. Unit 15 could be constituted, for example, by a magnetic storage disc of a known type. The selection of those stored signals which are to be transferred to the intermediate storage unit 15 is made by an operator in this particular embodiment. This is preferably done by taking the interesting signal out of the sequence of stored signals by means of the coding device so that preferably one normal voltage curve is located on either side of a voltage variation. The same applies, with certain restrictions, for the stored signals corresponding to the other variables.

The interesting stored signals located in the intermediate storage unit 15 are read out by a second tape recorder 16 and transferred to the tape recorder 16 via a digital-to-analog converter 17.

It is not always practical to reproduce the signals characterizing the system by means of the first storage unit 10 via the power amplifier 24 of a type whose internal resistance approaches zero. Peak circuit voltages of a system, for example, cannot be conveniently transferred by conventional power amplifiers. For this reason, a recognition generator 19 is associated with the intermediate storage unit 15. The recognition generator 19, according to a fixed program or on order from an operator, generates additional markings in the form of auxiliary pulses to the stored signals whereby these auxiliary pulses correspond, for example, to the position of peak circuit voltages. The auxiliary pulses are recorded on a special channel of the second tape recorder 16. Recognition generator 19 could be constituted by a circuit essentially identical to circuit 11 except that generator 19 is manually programmed. The circuit could also be constituted by an Astrodata Model 6190 Time Code Generator disclosed in Astrodata Bulletin 6190 of January 1964.

The interesting stored signals are recorded on the tape of the second tape recorder 16 substantially without interruptions. Spaces between the stored signals occur only because of the access time of the intermediate storage unit 15, which lies between zero and a maximum value determined by the particular structure of the intermediate storage unit 15. The storage unit contents therefore cannot be utilized directly for testing purposes since discontinuities occur between the individual stored signals that would never occur in the circuitry to be simulated. The stored signals of the second tape recorder 16 are therefore transferred to a third tape recorder 21 and a transient function generator 22 simultaneously generates a transient function in such a manner that a smooth transition occurs between the individual stored signals. The transient function generator 22 in this particular embodiment essentially consists of an oscillator which can be modulated in frequency, amplitude, and phase, and which operates as follows:

During transfer of a selected signal from the second tape recorder 16, the sensing device for the oscillator detects and follows the function of the transferred signal. At the end of the transferred signal, the oscillator takes over the detected function and transfers it to the third tape recorder 21, which is now connected to the transient function generator 22 by means of a known two-position electronic switch 20. The sensing device of the oscillator then picks up the succeeding stored signal and begins to adjust the function transferred from the oscillator to the third tape recorder 21 to the function of the next stored signal. Once this is accomplished, the electronic switch 20 again interconnects the tape recorders 16 and 21 to transfer the next stored signal to tape recorder 21.

Any other desired transient functions can be predetermined by means of the transient function generator 22, i.e., the rate of change by which one selected signal is smoothly connected to the next signal can be predetermined as any desired value. A second transient function generator 28, associated with the transient function generator 22, can further be connected, when desired, via the electronic switch 20 to the tape recorder 21 and thus create any further desired functions in place of the stored signals.

Since it is often too expensive to measure all existing operating conditions and combinations of the individual operating conditions of a system, and subsequently to store them by means of the first tape recorder 10, it is advisable to mix, combine, and supplement the signals recorded on the second tape recorder in such a manner that, on the whole, all circuit conditions are represented by the combination of variable electrical signals. For this purpose, the stored signals are transferred from the second tape recorder 16 to a fourth tape recorder, not shown in the drawings, whereby a selector circuit, also not shown in the drawings, rearranges the signals according to the desired sequence, which may be a random sequence. Since the first tape recorder 10 is a multi-track recorder, it can be used to perform the function of this additional tape recorder, and the selector circuit for the first tape recorder 10 can then perform the function of the additional selector circuit.

The signals stored in the third tape recorder 21 subsequently serve to control a power amplifier 24 having very small internal resistance. The output of power amplifier 24 is applied to the circuit or device to be tested via a filter 25, whose output is aplied to output conductors 26. A computer 35, motor 36, and vibrator table 37 are shown connected to output conductors 26, but other devices can also be connected thereto.

Since the power amplifier 24 cannot transfer the peak circuit voltages of the system, the output voltage of a power pulse generator 27 is superimposed on the output voltage of the power amplifier 24. The power pulse generator 27 is controlled by the auxiliary pulses generated by the recognition generator 19 and recorded on a special channel of tape recorder 21.

When simulating a multi-phase system connected to a generator, neutral point currents begin to flow in the neutral (star) point of the generator feeding the system when an imbalance of voltage occurs. The voltage signals corresponding to the neutral point current are stored on a special channel of the first tape recorder 10. Upon transfer from the second tape recorder 16 to the third tape recorder 21, a second transient function generator 28 (FIG. 3) generates a second transient function corresponding to the neutral point current which would flow if phase voltages corresponding to those created by the first transient function were applied to the input points to the system from the generator. With the aid of a summing amplifier 29, the stored signals corresponding to the neutral point currents are superimposed on the signals corresponding to the phase voltages and are transferred to the input of the power amplifier 24. In this manner, a shift in the voltage system can be simulated for the receivers, which shift occurs because of the flow of a neutral point current within the system.

FIG. 4 shows one embodiment of the second transient function generator 28 for simulating three phase voltages. With the aid of a transformer 23, in star- open triangle-connection, the sum of the three transient function voltages corresponding to the phase voltages of the system is formed in the transformer secondary winding. This sum voltage is applied, via an amplifier 30, to an impedance 31 which corresponds to the synchronous reactance of the generator feeding the system. Thus a current corresponding to the neutral point current flows within the impedance 31, as it would flow within the system if voltages corresponding to the transient function voltages were applied at its input points. The current flowing through the impedance is extracted as a proportional voltage via a small ohmic resistor 33, which is coupled to the input of an amplifier 32, whose output comprises the second transient function.

If the impedance 31 is varied, other arbitrarily defined shifts in the voltage system can be created for a receiver.

It is possible, with the aid of this invention, to perform a simulation lasting an unlimited time by utilizing at least two completely prepared magnetic tapes and two tape recorders (FIG. 5). First, the power amplifier 24 receives its input signal from the magnetic tape of the first tape recorder 10. Before the last interesting stored signal is transferred from this tape to the power amplifier, the transient function generator 22 transforms, with the aid of the transient function, the last stored value of the second tape recorder 16 smoothly and without interruption. The tape recorder 16, previously energized, now takes over the delivery of signals to the input of the power amplifier 24 via a three-way electronic switch 34. Simultaneously, the first tape recorder 10 is actuated by the second tape recorder 16 in such a manner that its tape will rewind. Upon completion of the recording on the second tape recorder 16, and upon completion of transfer by means of the transient function generator 22, the same tape of the tape recorder 10, or a newly inserted tape, can take over the control of the power amplifier 24.

Referring now to FIG. 6, there is shown one embodiment of a transient function generator 22 which can be applied in the case that the stored signals represent a single-phase voltage, or current.

The stored signals from the second tape recorder 16 are normally transferred to the third tape recorder 21 via the electronic switch 20. Shortly before the end of a selected signal being transferred, the electronic switch 20 is actuated by a pulse additionally recorded on the tape of the second tape recorder 16, so that now in the place of the selected signal, a transient function adapted to that signal is transferred to the third tape recorder 21 from the transient function generator 22. In this particular embodiment, the latter essentially consists of a voltage controlled oscillator 38, which can be modulated in phase, frequency, and amplitude by means of a phase control 39, a discriminator frequency 40, and the combination of an amplitude modulator 42, and an amplitude control 41, respectively.

The discriminator 40 detects the frequency of a transferred signal, and generates a signal proportional to that frequency destined to control the oscillator 38 in an open loop. The phase control 39 compares the phase of a transferred signal to that generated by the oscillator 38, and derives a control signal which is superimposed on the signal generated by the discriminator 40 so as to form a control voltage. Oscillator 38 and phase control 39 therefore constitute a closed-loop control. Until the end of a selected signal produced by the tape recorder 16, the signal generated by the oscillator 38 is thus approximately equal to that selected signal with respect to frequency, and phase.

Finally, by means of the amplitude control 41, and the amplitude modulator 42 the amplitude of the signal generated by oscillator 38 is adapted to the amplitude of the selected signal from tape recorder 16, so that now the output signal of the transient function generator 22 is approximately equal to the selected signal in frequency, phase, and amplitude.

If, now, the electronic switch 20 switches the input of the third tape recorder 21 from the second tape recorder 16 to transient function generator 22 before the end of a selected signal, there is virtually no change in the signal at the input of the third tape recorder 21 at that moment.

At the beginning of a second successive signal produced by the second tape recorder 16, the transient function generator adapts its output signal once more so that it will approximately equal the new selected signal after a lapse of time required for the control operation. After a predetermined time from the beginning of the transient function, allowing for that control operation the electronic switch 20 is again actuated so as to now interconnect the second and third tape recorders 16, 21. Consequently, the transient function describes the output signal of the transient function generator 22 during the time in which the electronic switch 20 permits the flux of signals from the transient function generator 22 to the third tape recorder 21. The time duration of the transient function can be modified according to the time constants of the phase control 39, and of the discriminator 40. All of the components 38–42 can be constituted by well-known circuit devices.

Suitable circuits for coding circuit 11 are described in the catalogue "Timing Equipment" which was published by Astrodata Inc., Anaheim, Calif.

What is claimed is:

1. A method of producing varying electrical signals which represent physical or electrical variables for testing the performance of electrical devices, comprising the steps of:
   (a) storing varying electrical signals in a first storage unit;
   (b) selecting from the varying signals stored in said first storage unit portions thereof which are of interest for testing the performance of electrical devices, components, and circuits;
   (c) transferring the selected portions of said varying signals from said first storage unit to a second storage unit;
   (d) transferring the selected portions of said varying signals in time sequence from said second storage unit to a third storage unit and simultaneously inserting transient functions between the end of each selected signal portion and the beginning of the next selected signal portion for storing in said third storage unit a continuous signal which includes the selected portions of said varying signals which are of interest for testing the performance of such electrical devices, components, and circuits; and
   (e) transferring the continuous signal stored in said third storage unit to an output conductor for application to the electrical device for testing the performance thereof with respect to the variables represented by the selected portions of said varying signals.

2. Apparatus for producing varying electrical signals which represent physical or electrical variables for testing the performance of electrical devices, comprising, in combination:
   (a) a first storage unit for receiving and storing varying electrical signals;
   (b) a second storage unit coupled to said first storage unit for receiving signals therefrom and for storing the received signals;
   (c) means coupled between said first and second storage units for selecting from the varying signals stored in said first storage unit portions thereof which are of interest for testing the performance of electrical devices, and for transferring the selected portions of said varying signals from said first storage unit to said second storage unit;
   (d) a third storage unit coupled to said second storage unit for receiving signals therefrom and for storing the received signals;
   (e) means coupled between said second and third storage units for transferring the selected portions of said varying signals in time sequence from said second storage unit to said third storage unit and transient function generator means for producing a transient function, said generator means being connected for delivering a transient function to said third storage unit between the end of each selected signal portion and the beginning of the next selected signal portion for storing in said third storage unit a continuous signal which includes the selected portions of said varying signals which are of interest for testing the performance of such electrical devices and
   (f) an output conductor coupled to said third storage unit for receiving said continuous signal therefrom and for applying said continuous signal to an electrical device, for testing the performance thereof with respect to the variables represented by the selected portions of said varying signals.

3. A method for producing varying electrical signals representative of the input signals to be aplied to an electrical device, for testing the performance of such device, comprising the steps of:
   (a) storing varying electrical signals in a first storage unit;
   (b) associating an identifying code with each stored signal portion;
   (c) selecting, by means of a selector device, those signal portions required for testing such device;
   (d) transferring such selected portions from the first storage unit to a second storage unit;
   (e) subsequently transferring the selected signal portions from the second storage unit to a third storage unit while generating transient electrical functions representing a smooth transition between successive selected signal portions and inserting such transient functions between such successive selected signal portions in the third storage unit; and
   (f) delivering the resulting continuous signal in the third storage unit to an output element for application, at a suitable amplitude, to the electrical device for testing the performance thereof with respect to the variables represented by such resulting signal.

4. An apparatus as defined in claim 2 wherein said varying electrical signals comprise frequency modulated signals and wherein said storage units comprise multichannel tape recorders.

5. An apparatus as defined in claim 2 wherein said first and third storage units comprise different channels of a single multi-channel tape recorder.

6. An apparatus as defined in claim 2, wherein said first and second storage units comprise tape recorders and wherein an intermediate storage unit having short access time is coupled between the two tape recorders for transfer of stored signals from the first tape recorder to the second tape recorder, the signals stored in the first tape recorder being first transferred to the intermediate storage unit, and the second tape recorder being operable to read out the signals stored in the intermediate storage unit so that the signals are transferred substantially without interruption from the intermediate storage unit to the second tape recorder.

7. An apparatus as defined in claim 6 wherein said intermediate storage unit comprises a magnetic disc storage unit and further comprising an analog-to-digital converter coupled to the input of said magnetic disc storage unit, and means coupled to said magnetic disc storage unit for superimposing coded identifying pulses on the signals stored therein.

8. An apparatus as defined in claim 2 further comprising:
   (g) a coding circuit coupled to said first storage unit for superimposing on the signals stored therein timing signals which represent in coded form the time expired from a specified moment and serve to consecutively identify the stored signals, said coding circuit incorporating a time code search device for selecting a predetermined code from the identification provided by said coding circuit and for detecting the occurrence of said predetermined code in the signals stored in said first storage unit; and
   (h) a control circuit coupled to said first storage unit for activating the output of said first storage unit for a predetermined period of time following the occurrence of said predetermined code in the signals stored in said first storage unit.

9. An apparatus as defined in claim 2 wherein said means for selecting the signals of interest include an oscilloscope for visually reproducing the signals stored in said first storage unit.

10. An apparatus as defined in claim 2 wherein said varying signals vary in frequency, amplitude, and phase, and wherein said transient function generator comprises oscillators which can be modulated in frequency, amplitude and phase whereby the beginning of the transient functions can be adjusted to match the characteristics of the end of one selected signal and the end of the transient functions can be adjusted to match the characteristics of the beginning of the next selected signal.

11. An apparatus as defined in claim 2, and further comprising an output amplifier with an internal resistance approaching zero coupled to said output conductor.

12. An apparatus as defined in claim 6 further comprising: a recognition generator coupled to the intermediate storage unit for superimposing recognition pulses on the signals stored therein, said recognition pulses corresponding to pulses above a certain amplitude in said stored signals; and a pulse generator coupled to said output conductor, said pulse generator being connected to be responsive to said recognition pulses and being triggered thereby.

13. An apparatus as defined in claim 2 wherein said electrical device whose performance is to be tested comprises an electronic computer.

14. An apparatus as defined in claim 2, wherein said varying electrical signals represent mechanical vibrations and wherein said output conductor is coupled to an electrodynamic vibrating table for vibration testing of said electrical devices.

15. An apparatus as defined in claim 2, wherein said varying signals represent speed control signals for a rotating electrical device, said electrical device whose performance is to be measured comprising such a rotating electrical device, and the output signals of said apparatus serving to control the speed of said rotating electrical device.

16. An apparatus as defined in claim 2 and further comprising a second transient function generator coupled between said second and third storage units for generating predetermined electrical functions to be stored in said third storage unit along with the selected portions of said varying signals stored therein.

17. An apparatus as defined in claim 2 wherein said varying electrical signals represent the frequencies, voltages, phase relationships, and neutral point currents of a multi-phase system, and wherein said transient function generator comprises a first transient function circuit for generating a first transient function representing the voltages of said multi-phase system and a second transient function circuit for generating a second transient function representing the neutral point currents corresponding to the voltages represented by said first transient function.

18. An apparatus as defined in claim 17 wherein said first transient function generator produces a plurality of output signals each representing one voltage of said multi-phase system, and wherein said second transient function generator comprises a voltage summing circuit coupled to the output of said first transient function generator for vectorially adding the output signals thereof, an impedance coupled to the output of said summing circuit, said impedance being equal to the reactance of the generator for said multi-phase system, whereby the current flow through said impedance will be equal to the neutral point current of said multi-phase system corresponding to the output voltages of said first transient function generator.

References Cited
UNITED STATES PATENTS

| | | | |
|---|---|---|---|
| 2,837,729 | 6/1958 | Houghton et al. | 340—15 |
| 2,962,625 | 11/1960 | Berwin et al. | 315—26 |
| 2,996,666 | 8/1961 | Baker | 324—73 |
| 3,286,177 | 11/1966 | Boer et al. | 324—103 |
| 3,304,497 | 2/1967 | MacRitchie et al. | 324—120 |

PAUL J. HENON, Primary Examiner

P. R. WOODS, Assistant Examiner

U.S. Cl. X.R.

324—76, 113